United States Patent
Martini et al.

(10) Patent No.: US 12,524,405 B1
(45) Date of Patent: Jan. 13, 2026

(54) EXECUTING QUERIES IN COMPUTING SYSTEMS USING EXECUTION PLANS GENERATED BY GENERATIVE ARTIFICIAL INTELLIGENCE MODELS

(71) Applicant: QUALCOMM Incorporated, San Diego, CA (US)

(72) Inventors: Amr Mamoun Martini, San Diego, CA (US); Arvind Vardarajan Santhanam, San Diego, CA (US); Christopher Lott, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 18/892,015

(22) Filed: Sep. 20, 2024

(51) Int. Cl.
  *G06F 16/2453* (2019.01)
(52) U.S. Cl.
  CPC .............. *G06F 16/24542* (2019.01)
(58) Field of Classification Search
  CPC .................................. G06F 16/24542
  See application file for complete search history.

(56) References Cited

U.S. PATENT DOCUMENTS

| | | | |
|---|---|---|---|
| 2020/0349161 A1* | 11/2020 | Siddiqui | G06N 20/10 |
| 2021/0382920 A1* | 12/2021 | Eltabakh | G06F 16/288 |
| 2022/0067008 A1* | 3/2022 | Li | G06N 3/006 |
| 2022/0188340 A1* | 6/2022 | Davis | G06F 16/29 |
| 2023/0171154 A1* | 6/2023 | Kattepur | H04L 41/0823 709/220 |
| 2025/0045277 A1* | 2/2025 | Hwang | G06F 16/24545 |
| 2025/0086202 A1* | 3/2025 | Zhu | G06F 16/2455 |

OTHER PUBLICATIONS

Anonymous: "Automatic Calibration and Error Correction for Generative Large Language Models via Pareto Optimal Self-supervision", Oct. 13, 2023, XP093328373, pp. 1-21, p. 1, paragraph [0003].
International Search Report and Written Opinion—PCT/US2025/040096—ISA/EPO—Nov. 12, 2025.
Joseph H., et al., "Adaptive Query Processing: Technology in Evolution", Jun. 30, 2000, XP093324764, pp. 1-12, p. 7-p. 8.
Xufeng Z., et al., "RRdE: A Decision Making Framework for Language Agents in Interactive Environments", 2024 International Joint Conference on Neural Networks (IJCNN), IEEE, Jun. 30, 2024, pp. 1-8, 8 Pages, XP034689951, p. 3-p. 4, figure 2.

* cited by examiner

*Primary Examiner* — Dangelino N Gortayo
(74) *Attorney, Agent, or Firm* — Patterson & Sheridan LLP

(57) ABSTRACT

Certain aspects provide techniques and apparatus for executing queries in a computing system using machine learning models. An example method generally includes receiving a plan to satisfy a request in the computing system and event log data associated with execution of the plan. The plan generally specifies a first plurality of actions to be performed by the computing system at a first level of granularity. Using a plan refinement machine learning model, a refined plan is generated when the event log data indicates that execution of the generated plan results in one or more execution errors and the one or more execution errors are solvable. Generally, the refined plan specifies a second plurality of actions to be performed by the computing system at a second level of granularity, the second level of granularity being finer than the first level of granularity.

17 Claims, 6 Drawing Sheets

EXECUTING QUERIES IN COMPUTING SYSTEMS USING EXECUTION PLANS GENERATED BY GENERATIVE ARTIFICIAL INTELLIGENCE MODELS

INTRODUCTION

Aspects of the present disclosure relate to executing queries in computing systems using generative artificial intelligence models (also referred to as "generative models" or "generative machine learning models").

Generative artificial intelligence models, such as large language models, can be used in artificial intelligence assistants to allow users of such assistants to interact using natural language inputs (e.g., spoken prompts converted from audio to text, textual prompt inputs, etc.). Generally, these artificial intelligence assistants can be used to perform various tasks through different plugins or other tools that interface with these artificial intelligence assistants. These plugins may, for example, allow users to obtain news from various sources (e.g., weather sources, news outlets, equities market data feeds, etc.), schedule events, plan travel, control robots or other household devices, or the like.

BRIEF SUMMARY

Certain aspects provide a processor-implemented method for executing queries in a computing system using machine learning models. An example method generally includes receiving a plan to satisfy a request in the computing system and event log data associated with execution of the plan. The plan generally specifies a first plurality of actions to be performed by the computing system at a first level of granularity. Using a plan refinement machine learning model, a refined plan is generated when the event log data indicates that execution of the generated plan results in one or more execution errors and the one or more execution errors are solvable. Generally, the refined plan specifies a second plurality of actions to be performed by the computing system at a second level of granularity, the second level of granularity being finer than the first level of granularity.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict example features of certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
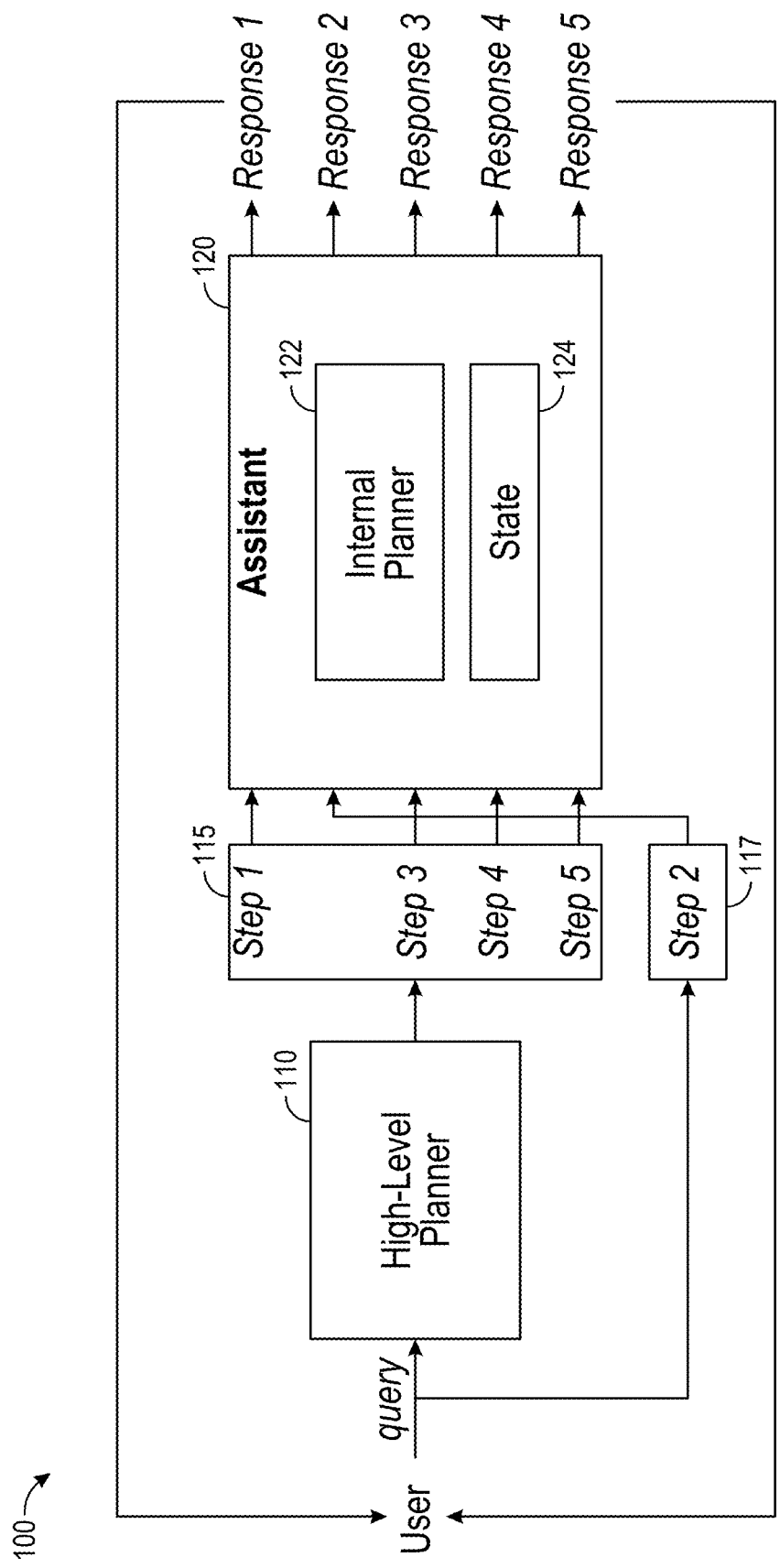
FIG. 1 illustrates an example of executing a query in a computing system.

Aspects of the present disclosure provide apparatuses, methods, processing systems, and non-transitory computer-readable mediums for executing queries in a computing system using generative artificial intelligence models.

Artificial-intelligence-model-based assistants generally allow users to interact with a computing device using natural language inputs in order to execute various tasks on or using the computing device. To do so, an artificial-intelligence-model-based assistant can interface with various software tools that can ingest specific types of information in order to perform specific tasks. For example, an artificial-intelligence-model-based assistant can interface with a first application to respond to requests to add events to a calendar, a second application to respond to requests for the latest news, a third application to respond to requests to book flights or hotel rooms, and the like. These applications generally may be invoked through calling functions exposed by various application programming interfaces (APIs).

Generally, queries input into an artificial-intelligence-model-based assistant request the artificial-intelligence-model-based assistant to perform a specified action. These queries may be broad in scope and involve the execution of multiple functions across different APIs in order to satisfy these queries. Further, the parameters specified in these queries may not be understood as valid parameters by an API. Thus, in order to execute queries input into the artificial-intelligence-model-based assistant, a planner (or solver) may be used to decompose a query into a sequence of sub-queries that can be satisfied through the invoking of API calls that results in the satisfaction of these sub-queries.

Generally, an artificial-intelligence-model-based assistant may include a planner (or solver) that generates an execution plan for responding to a query. Execution plans generated by a planner (or solver) generally specify a set of tasks that are to be performed in order to execute a task specified in a request by a user. By generating an execution plan, a planner (or solver) can allow for various actions to be performed via interaction with a user, such as invoking a function implemented by a plugin or other application which interfaces with an artificial-intelligence-model-based assistant, a multi-turn dialogue between the user and the artificial-intelligence-model-based assistant, requesting confirmation from a user prior to performing a task through a plugin or other application, performing additional functions in relation to results previously obtained by the artificial-intelligencemodel-based assistant for a given query, asking a user clarifying questions, and the like. However, the generation of an execution plan may be computationally expensive, and an artificial-intelligence-model-based assistant may not be able to determine whether the artificial-intelligence-model-based assistant or the plugins or applications with which the artificial-intelligence-model-based assistant interfaces are able to satisfy a query received for processing.

Certain aspects of the present disclosure provide techniques for efficiently generating execution plans for responding to queries using an artificial-intelligence-model-based assistant. As discussed in further detail herein, an initial plan and an execution log may be received at an artificial-intelligence-model-based execution plan generator from an artificial-intelligence-model-based assistant in response to an input query. Based on the error log, the artificial-intelligence-model-based execution plan generator can determine if the errors, if any, can be rectified by refining the initial plan. If the errors can be rectified, the artificial-intelligence-model-based execution plan generator can generate a refined, more granular, plan and output the plan for execution by the artificial-intelligence-model-based assistant. This process of refining an execution plan may continue until the iteratively refined execution plan is executable or a terminal error state is reached, for example. By iteratively refining an execution plan for use by an artificial-intelligence-model-based assistant, certain aspects of the present disclosure may allow for artificial-intelligence-model-based assistants to generate responses to a wide variety of queries with varying levels of complexity.

Example Generating Execution Plans for Responding to Queries Using Artificial-Intelligence-Model-Based Assistants FIG. 1 illustrates an example 100 of executing a query in a computing system using an artificial-intelligence-model-based assistant 120 (labeled as "assistant"). Generally, the example 100 illustrates an artificial-intelligence-model-based assistant 120 that allows for complex queries to be processed while minimizing, or at least reducing, user interaction with the artificial-intelligence-model-based assistant in instructing the artificial-intelligence-model-based assistant 120 to execute the query with granular step-by-step tasks.

As illustrated, to generate a response to an input query, an input query may be input into a high-level planner 110, which generates an execution plan 115. Generally, the high-level planner 110 may be a large language model (LLM) or other generative artificial intelligence model that, for example, can identify an intent in the query input into the high-level planner and identify a series of steps that the artificial-intelligence-model-based assistant 120 can use to identify the functions to invoke (e.g., via one or more API function calls) or other actions to be performed in order to satisfy the query.

The artificial-intelligence-model-based assistant 120, as illustrated, includes an internal planner 122 and a state 124. The internal planner 122 generally uses the execution plan 115 to identify one or more actions to perform to satisfy a step defined in the execution plan 115 for satisfying the query provided to the high-level planner 110. Generally, the internal planner 122 may be a generative artificial intelligence model that is smaller in size than a generative artificial intelligence model used by the high-level planner 110 to generate the execution plan 115. To identify the action(s), the internal planner 122 may use the current state 124 (which may include inputs into the artificial-intelligence-model-based assistant 120 and any prior outputs generated by the artificial-intelligence-model-based assistant 120 invoking functions to satisfy prior steps in the execution plan 115) to identify functions to invoke in an application (e.g., via one or more API calls). The identified functions may be executed, and responses may be output to the user as a response to the query.

In some aspects, as illustrated in FIG. 1, the execution plan 115 includes an instruction that solicits further information from the user. In this case, step 1 of the execution plan 115 may indicate that the artificial-intelligence-model-based assistant 120 is missing information to satisfy the query. For example, in a query that requests that the artificial-intelligence-model-based assistant 120 identify the cheapest ride to a specified destination, step 1 of the execution plan 115 generated by the high-level planner 110 may indicate that the artificial-intelligence-model-based assistant demands additional information (e.g., the address of the destination) in order to satisfy the query. Thus, the response generated by the artificial-intelligence-model-based assistant 120 to step 1 of the execution plan 115 may be a query that requests the address of the destination. In response, the execution plan 115 may be augmented by an additional step 117 (labeled "step 2"), in which the user responds to the query output by the artificial-intelligence-model-based assistant 120. The response and an indication of the current step in the execution plan 115 which is being executed may be maintained as the state 124. The state 124 may generally inform how the artificial-intelligence-model-based assistant 120 responds to the initial query input into the high-level planner 110 from a user of the artificial-intelligence-model-based assistant 120.

Subsequently, the artificial-intelligence-model-based assistant 120 can execute the other steps in the execution plan 115 based on the state 124 and update the state 124. Returning to the example of requesting that the artificial-intelligence-model-based assistant 120 identify the cheapest ride to a specified destination, the artificial-intelligence-model-based assistant 120 can request, via invoking one or more API calls at one or more plugins or other applications, the price of a ride from each of multiple providers. After obtaining the price of a ride to the destination from each of the providers, the artificial-intelligence-model-based assistant 120 can execute the final step of the execution plan 115 to identify the cheapest ride from the responses received from each of the providers and output, to the user of the artificial-intelligence-model-based assistant 120, information identifying the cheapest ride.

While the high-level planner 110 can generate an execution plan 115 that the artificial-intelligence-model-based assistant 120 can use to respond to a variety of queries, an abstraction gap generally exists between the high-level planner 110 and the artificial-intelligence-model-based assistant 120. This abstraction gap may, for example, be illustrated by the additional steps (e.g., the step 117) which the artificial-intelligence-model-based assistant 120 injects into the execution plan in order to satisfy the request. To allow for the high-level planner 110 to be adapted to the artificial-intelligence-model-based assistant 120, the high-level planner 110 may be prompt-engineered or trained to output a low-level, granular plan that can be executed by the artificial-intelligence-model-based assistant 120. However, in prompt-engineering or training the high-level planner 110, the high-level planner may not account for the abilities of the internal planner 122 of the artificial-intelligence-model-based assistant 120 to generate a plan that satisfactorily responds to the user query. Further, because the high-level planner 110 generates a highly granular plan including a large number of steps, the high-level planner 110 may expend a significant amount of computing resources and time in generating an execution plan. Further, if the artificial-intelligence-model-based assistant 120 generates an error in executing the execution plan, replanning the execution plan may use further computing resources and time.

To improve the computational efficiency involved in responding to user queries using an artificial-intelligence-model-based assistant, as discussed in further detail herein, certain aspects of the present disclosure provide techniques for generating an initial plan for responding to a user query. This initial plan may be executed and iteratively refined until a plan that results in the generation of a satisfactory response to the user query is generated by the artificial-intelligence-model-based assistant. By doing so, aspects of the present disclosure may account for the ability of the artificial-intelligence-model-based assistant to handle abstractions in user queries while accelerating the speed at which responses are generated to user queries relative to the speed at which responses are generated to a user query based on a granular execution plan.

Figure 2:
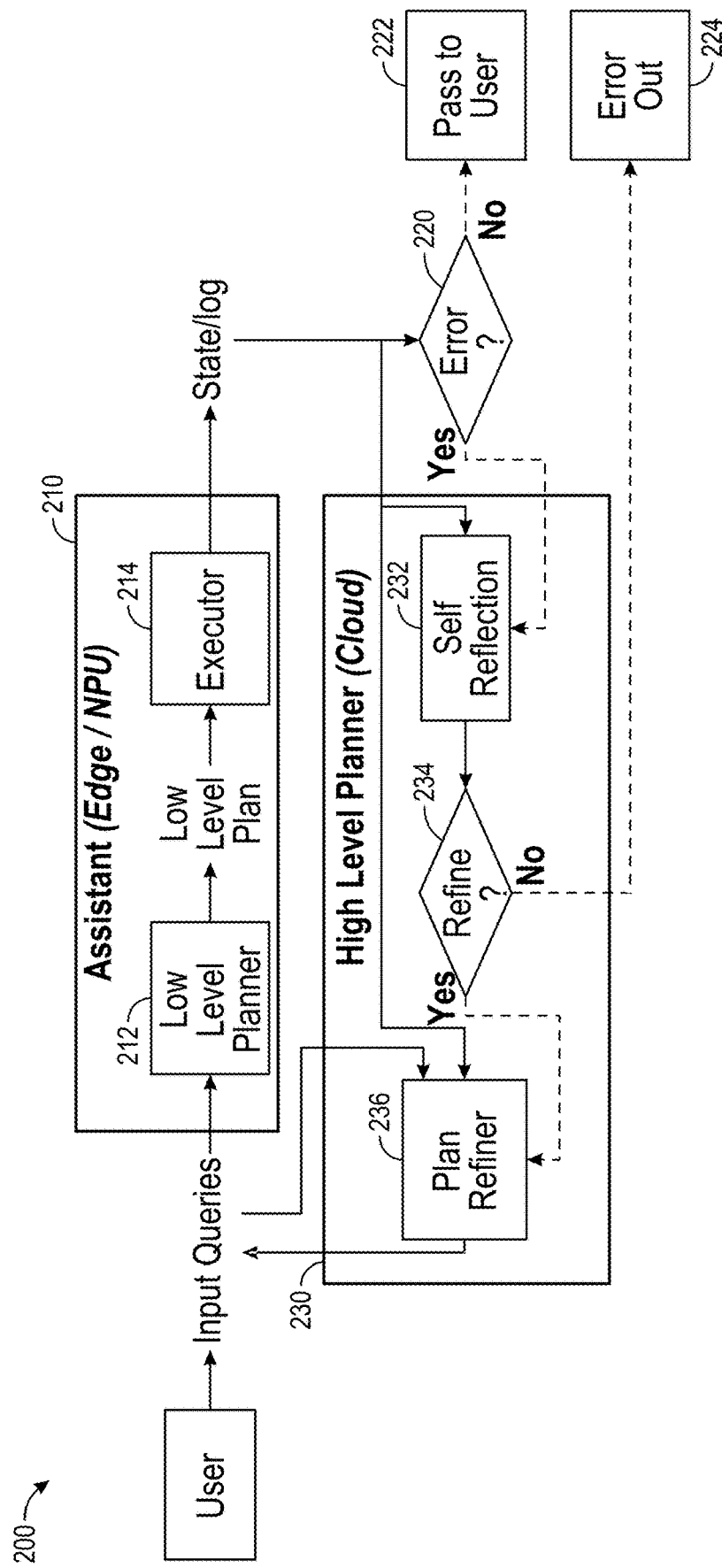
FIG. 2 illustrates an example pipeline for plan generation and refinement for executing a query in a computing system, according to certain aspects of the present disclosure.

FIG. 2 illustrates an example pipeline 200 for plan generation and refinement for executing a query in a computing system, according to certain aspects of the present disclosure.

As illustrated, the pipeline 200 includes an assistant 210 and a high-level planner 230. The assistant 210 may execute on an edge device, and the high-level planner 230 may execute in a cloud computing or other remote computing environment, as shown. Generally, the assistant 210 includes a low-level planner 212 and a plan executor 214. To respond to an input query provided by a user of the assistant 210, the low-level planner 212 generates an initial plan including an initial set of steps to execute to generate a response to the input query. This initial plan may be passed to an executor 214. The executor 214 attempts to execute the initial plan (e.g., by invoking one or more functions in one or more external applications via API function calls exposed by these external applications), and an execution state and execution log may be generated based on the attempt to execute the initial plan.

At block 220, the execution state and execution log may be examined to determine whether an execution error has occurred (and thus whether a satisfactory response to the input query has been generated in response to the input query). If the execution state and execution log indicate that no errors have occurred, then at block 222, the response generated by the assistant 210 (reflected in the execution state data passed to block 220) may be output to the user of the assistant 210.

Otherwise, if at block 220, the execution state and execution log indicate that errors have occurred in executing the initial plan, the execution state and log data may be passed to the high-level planner 230 for further processing. As illustrated, the high-level planner 230 includes a self-reflection block 232 and a plan refiner 236.

The self-reflection block 232 generally uses a plan generated by the low-level planner 212 and the execution state and execution log data generated by the executor 214 to determine whether the execution plan executed by the executor 214 that resulted in the generation of the input execution state and execution log can be refined. In some aspects, the self-reflection block 232 may be a prompt-engineered generative artificial intelligence model that uses the execution state and execution log data to determine whether a refinement of the plan can be performed. In some aspects, the self-reflection block 232 may be a rule-based model that uses the execution state, execution log data, and defined rules to determine whether a refinement of the plan can be performed. In some aspects, the self-reflection block 232 may be a classifier model that classifies the execution state and the execution log data as data indicative of whether the plan associated with the execution state and the execution log data can be refined or cannot be refined.

If the self-reflection block determines, at block 234, that the execution plan can be refined, then the plan refiner 236 rewrites the execution plan into a more granular plan. Generally, in rewriting the execution plan into a more granular plan, the plan refiner 236 identifies steps in the execution plan that resulted in an error, and based on the error and the execution state information generated by the executor 214, generates additional steps that attempt to address the error, as discussed in further detail below.

Figure 3:
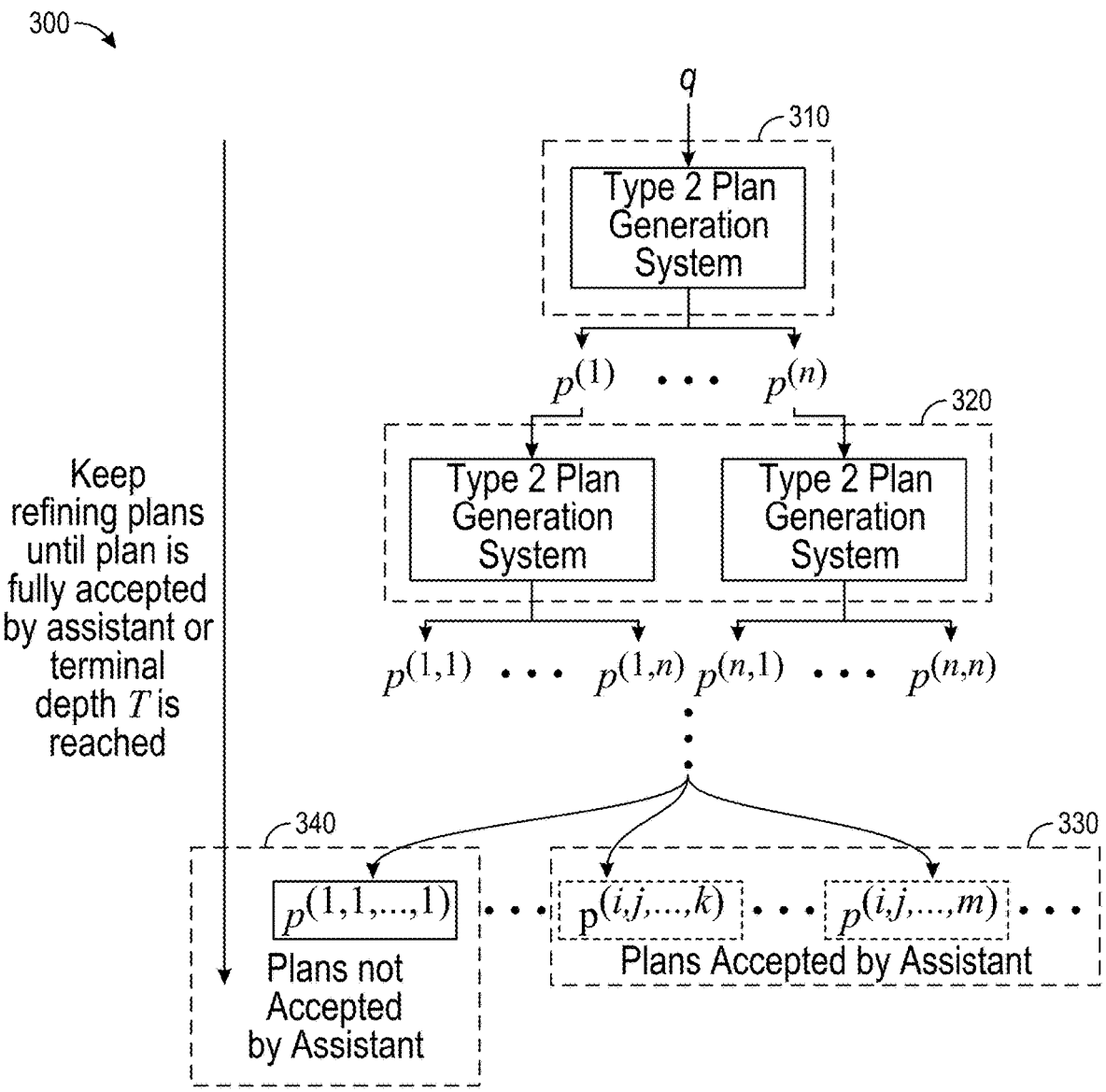
FIG. 3 illustrates an example of refining a plan refinement machine learning model based on reinforcement learning techniques, according to certain aspects of the present disclosure.

FIG. 3 illustrates an example 300 of refining a plan via a plan refinement machine learning model trained based on reinforcement learning techniques, according to certain aspects of the present disclosure.

As illustrated, example 300 includes generating, at block 310, a plurality of execution plans $p^{(1)}$ through $p^{(n)}$ for an input query q. Generally, the execution plans may be plans generated by a generative artificial intelligence model, such as that deployed at the low-level planner 212 and/or the plan refiner 236 illustrated in FIG. 2, that defines a series of steps to execute in order to satisfy the input query q. For any pair of plans $p^{(i)}$, $p^{(j)} \sim \pi_\theta(p|q, T)$ generated by a generative artificial intelligence model $\pi$, where $\theta$ represents the weights used to train the generative artificial intelligence model $\pi$, the plan with fewer steps may be preferred as the output of the generative artificial intelligence model over the plan with more steps. If the plan $p^{(i)}$ is accepted by the assistant as a valid plan and the plan $p^{(j)}$ is not accepted by the assistant as a valid plan that can result in the generation of a response to the input query q, then the plan $p^{(i)}$ may be preferred over the plan $p^{(j)}$ in training the generative artificial intelligence model $\pi$.

In some aspects, in training the generative artificial intelligence model $\pi$, reinforcement learning techniques may be used based on the length of a plan p generated by the generative artificial intelligence model $\pi$ and whether a plan is accepted by the assistant as a valid execution plan for satisfying the query q. For example, the generative artificial intelligence model $\pi$ may be trained based on maximizing, or at least increasing, a preference score, such as a preference score modeled by the Bradley-Terry preference model according to the equation:

$$P_\phi(p^{(i)} \succ p^{(j)} | q) = \frac{e^{r_\phi(q, p^{(i)})}}{e^{r_\phi(q, p^{(i)})} + e^{r_\phi(q, p^{(j)})}}$$

where $r_\phi$ represents a reward model.

In some aspects, to train the generative artificial intelligence model, a plurality of plans may be generated for a base data set $\mathcal{D}$ of queries q. In doing so, a reward function may be learned which may be used during fine-tuning of the generative artificial intelligence function using reinforcement learning techniques. For example, the reward function may be modeled as a binary classification of embeddings in an embedding model, according to the equation:

$$\mathcal{L}_r(\phi|D) = -\mathbb{E}_\mathcal{D}[\log \sigma(r_\phi(q, p^{(i)}) - r_\phi(q, p^{(j)}))].$$

The weights of the generative artificial intelligence model π may be learned, for example, based on maximization using a policy optimization technique (e.g., proximal policy optimization (PPO), which trains an agent to identify an optimal solution for a given task). In doing so, the weights of the generative artificial intelligence model π may be learned according to the equation:

$$\max_\theta \mathbb{E}_{q\sim\mathcal{D},p\sim\pi_\theta}(p\,|\,q,\,T)[r_\phi(q,\,p)] - \beta \mathbb{D}_{KL}[\pi_\theta(p\,|\,q,\,T)\,|\,\pi_{ref}(p\,|\,q,\,T)]$$

where $\mathbb{D}_{KL}$ represents a Kullback-Leibler divergence, $\pi_{ref}$ represents a base model, and $\pi_\theta$ represents the generative artificial intelligence model which will be deployed for use in generating execution plans for use in satisfying a query q input into the generative artificial intelligence model for processing.

As illustrated, in generating execution plans, it may be assumed that the plans $p^{(1)}$ through $p^{(n)}$ generated at block 310 are each rejected as plans that result in the generation of an error when executed. Thus, at block 320, the plans $p^{(1)}$ through $p^{(n)}$ may be refined by the generative artificial intelligence model π into plans with more granular detail than the plans $p^{(1)}$ through $p^{(n)}$ generated at block 310. For example, the generative artificial intelligence model π may be trained to generate n plans for each plan input into the generative artificial intelligence model π for refinement. Thus, as illustrated, at block 320, the generative artificial intelligence model π generates refined execution plans $p^{(1,1)}$ through $p^{(1,n)}$ for plan $p^{(1)}$, refined execution plans $p^{(n,1)}$ through $p^{(n,n)}$ for plan $p^{(n)}$, and so on.

The iterative refinement of execution plans by the generative artificial intelligence model π may continue until an execution plan is fully accepted by a generative artificial-intelligence-model-based assistant (e.g., the assistant 210 illustrated in FIG. 2) or until a terminal depth T is reached. For example, as illustrated, the iterative refinement of execution plans may result in the generation of a tree data structure including a root node q, an initial set of plans $p^{(1)}$ through $p^{(n)}$ in a first level of the tree, and so on, until a level in the tree includes an accepted plan or the depth of the tree reaches the terminal depth T. As illustrated, the bottom of the tree data structure may include a set of accepted plans 330 and a set of rejected plans 340 at a given stage of refinement. If the set of accepted plans 330 is not the null set—that is, includes at least one plan that is accepted by the assistant as a valid plan—the plan refinement process may be terminated, and the accepted plan(s) may be executed by the assistant. During training of the generative artificial intelligence model π, the generation and refinement of execution plans may also terminate when a plan is accepted by the assistant; however, in some aspects, the refinement of execution plans may continue until a valid execution plan is generated or the terminal depth T is reached.

Figure 4:
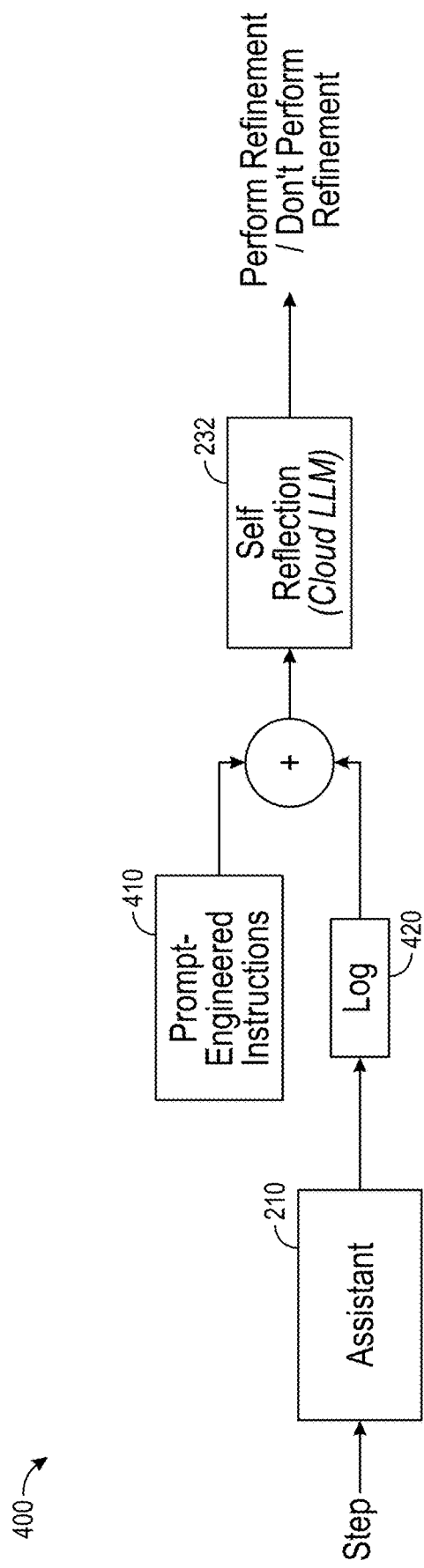
FIG. 4 illustrates an example pipeline for determining that an execution plan is refinable, according to certain aspects of the present disclosure.

FIG. 4 illustrates an example pipeline 400 for determining that an execution plan is refinable, according to certain aspects of the present disclosure. Generally, the pipeline 400 illustrates execution of self-reflection operations to determine whether an execution plan is refinable or if a terminating condition has been reached when the execution of a step in the execution plan by a generative artificial-intelligence-model-based assistant results in an execution error.

As illustrated, an execution step in a previously generated execution plan (e.g., an initial plan generated by the assistant 210 or a refined plan generated by the high-level planner 230 illustrated in FIG. 2) may be input into the assistant 210 for execution. The assistant 210 may generate log data 420 that indicates that an error occurred during execution of the step. To determine whether the execution plan is refinable—that is, to determine whether the step in the execution plan that resulted in an error can be refined into a plurality of more granular steps that is likely to allow the assistant 210 to generate a valid response to an input query—the log data 420 may be added to various prompt-engineered instructions to generate an input into the self-reflection block 232.

As discussed above, the self-reflection block 232 may be a generative artificial intelligence model, such as a large language model, that can generate feedback responsive to the log data 420 and the prompt-engineered instructions 410. The feedback may indicate, for example, whether the step can be refined or if a terminal error state is reached. If the feedback indicates that the step can be refined, the feedback generally includes additional steps to inject into the execution plan for future execution. In some aspects, the feedback may indicate or be related to a complexity associated with resolving the execution errors. Generally, execution errors with a sufficiently low complexity to be solvable by the plan refiner 236 may include execution errors that can be rectified by presenting additional questions to a user, by rewriting a step in an execution plan into multiple steps, or the like. Execution errors with a complexity that is unlikely to be solved by refinement of the execution plan may include, for example, errors in which an unknown or unsupported tool is invoked, errors in which the input data is in a wrong domain from the domain in which data is expected to be received by the assistant 210 or an application with which the assistant 210 interfaces, or the like.

In some examples, an error identified in the log data 420 may specify that the input query is missing information that is desired in order for the assistant 210 to generate a response to the input query (e.g., by itself or by invoking functions exposed by one or more plugins with which the assistant 210 interfaces). In such a case, the log data 420 may indicate that the assistant 210 had not previously injected a request for additional information from the user of the assistant 210, and the self-reflection block 232 can determine, based on the error information, whether the input query is, in fact, missing information, the type of the missing information, and the source of the missing information. Such a determination may be based, for example, on the prompt-engineered instructions 410 including instructions to (1) determine whether the error in the log data 420 indicates that the input query or step is missing information and (2) the type of data that is missing from the input query or step. Based on determining that the input query is actually missing information, and the type and source of the missing information, the self-reflection block 232 can invoke the plan refiner 236 to refine the execution plan. The high-level planner 235 can, for example, generate one or more outputs injecting additional steps into the execution plan. These steps may include, for example, steps instructing the assistant 210 to request the missing information from a user of the assistant 210 or to request the missing information from one or more non-user sources (e.g., by querying a database, sending a request for the missing information to an external application, or the like).

In some examples, an error identified in the log data 420 may specify that the input query requests the execution of a function that the assistant 210 does not support. In such a case, the log data 420 may specify that a tool identified in the request is not supported or if the step that generated the error is a multi-intent step that is not supported by the assistant 210 (e.g., when the assistant 210 supports single-intent queries). If, based on the log data 420 and the prompt-engineered instructions 410, which may request that the self-reflection block 232 determine whether the error in the log data 420 indicates whether the input query is a multi-intent query, the self-reflection block 232 determines that the input query is a multi-intent query, the self-reflection block 232 invoke the plan refiner 236 to refine the execution plan. The high-level planner 235 can, for example, decompose the input query into a plurality of more granular execution steps for execution by the assistant 210. If, however, the self-reflection block 232 determines that the input query requests execution of an action that the assistant 210 does not support (e.g., natively or via invoking one or more API calls to plugins or applications with which the assistant 210 interfaces), the self-reflection block 232 can exit with an error and terminate refinement operations with respect to the input query.

In some examples, an error identified in the log data 420 may indicate that the assistant 210 incorrectly predicted the steps to execute in order to generate a response to the input query or had low confidence in the prediction of those steps. In such a case, the log data 420 may indicate that the assistant 210 had low confidence in the prediction or may indicate that an invalid or unsupported tool was requested to be used to generate a response to the input query. To determine whether the execution plan can be refined, the self-reflection block 232 can use prompt-engineered instructions 410 to determine whether the error identified in the log data 420 indicated a low degree of confidence in a prediction and if the assistant 210 had not presented a clarifying question to the user. If so, the self-reflection block 232 can invoke the plan refiner 236 to refine the plan. In such a case, the plan refiner 236 can perform a variety of tasks to attempt to increase the likelihood that the predicted step will execute successfully and result in the generation of a valid response to the input query. For example, the plan refiner 236 can form a step to solicit clarifying information from the user, rewrite the step autonomously, or the like.

If low confidence in a prediction manifests as another error, such as an indication that the input query or step requests the use of an invalid or unsupported tool, the prompt-engineered instructions 410 can instruct the self-reflection block 232 to generate an independent prediction of the appropriate step for the assistant 210 to execute. If the step predicted by the assistant is different from the step predicted by the self-reflection block 232, the plan refiner 236 can rewrite the step to execute the step predicted by the self-reflection block 232 (based on an assumption that the self-reflection block 232 can more accurately generate or identify steps in an execution plan than the assistant 210). Otherwise, the self-reflection block 232 can determine that a terminating error has occurred and terminate refinement of the execution plan.

By using a generative artificial-intelligence-model-based assistant to generate an initial plan at a high level of abstraction and using a high-level planner to refine particular steps of an execution plan, aspects of the present disclosure may allow for rapid generation of responses to input queries into a generative artificial-intelligence-model-based assistant. For example, because the high-level planner refines a small number of steps in an execution plan instead of generating an entire execution plan, certain aspects of the present disclosure may reduce the computational expense involved in generating an execution plan for generating a response to an input query, as executing the large models used by the high-level planner may be omitted for steps in the execution plan that the generative artificial-intelligence-model-based assistant is capable of generating. Further, certain aspects of the present disclosure may allow for the generative artificial-intelligence-model-based assistant to generate accurate execution plans for satisfying an input query, which may reduce the frequency with which a high-level planner is invoked to refine an execution plan.

Figure 5:
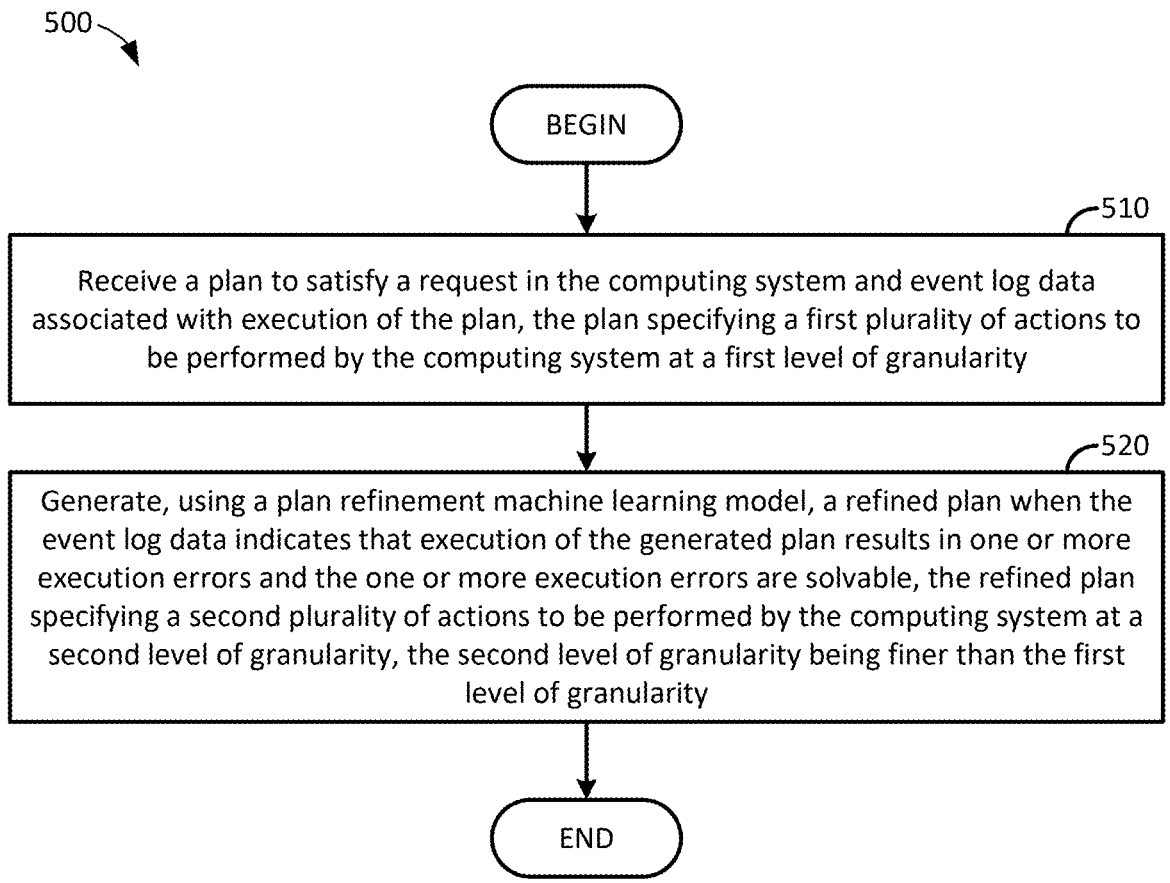
FIG. 5 illustrates example operations for executing a query in a computing system using machine learning models and an iteratively refined execution plan, according to certain aspects of the present disclosure.

Example Operations for Generating Execution Plans for Responding to Queries Using Artificial-Intelligence-Model-Based Assistants FIG. 5 illustrates example operations 500 for executing a query in a computing system using machine learning models and an iteratively refined execution plan, according to certain aspects of the present disclosure.

As illustrated, the operations 500 begin at block 510, with receiving a plan to satisfy a request in the computing system and event log data associated with execution of the plan. Generally, the plan specifies a first plurality of actions to be performed by the computing system at a first level of granularity. In some aspects, the actions to be performed by the computing system may include function calls to be invoked by an artificial intelligence model-based assistant, a sequence of actions to be performed by the artificial intelligence model-based assistant in natural language or pseudo-code, or the like.

At block 520, the operations 500 proceed with generating, using a plan refinement machine learning model, a refined plan when the event log data indicates that execution of the generated plan results in one or more execution errors and the one or more execution errors are solvable. Generally, the refined plan specifies a second plurality of actions to be performed by the computing system at a second level of granularity. The second level of granularity is generally finer than the first level of granularity.

In some aspects, the operations 500 further include determining that the one or more execution errors are solvable. Generally, determining that the one or more execution errors are solvable includes determining, based on a generative artificial intelligence model and a set of prompt-engineered instructions, that a complexity associated with resolving the one or more execution errors is less than a threshold complexity level.

In some aspects, determining that the one or more execution errors are solvable includes determining, based on a rule-based machine learning model, that a complexity associated with resolving the one or more execution errors is less than a threshold complexity level.

In some aspects, determining that the one or more execution errors are solvable includes determining, based on a classifier machine learning model, that a complexity associated with resolving the one or more execution errors is less than a threshold complexity level.

In some aspects, the plan refinement machine learning model comprises a generative model trained based on reinforcement learning with assistant feedback. Generally, the assistant feedback may include an indication of whether the refined plan generated by the plan refinement machine learning model is executable by an assistant executing on another computing system. In some aspects, the generative model may be further trained to minimize, or at least reduce, a length of the refined plan.

In some aspects, generating the refined plan comprises iteratively generating refined plans until one of the generated refined plans is accepted as an executable plan.

In some aspects, generating the refined plan comprises iteratively generating refined plans until a threshold number of plan refinement iterations have been executed by the plan refinement model. In some aspects, the plan refinement machine learning model comprises a tree model trained based on generating a tree data structure including a plurality of nodes. Each node in the tree data structure may represent one of a plan or one or more refined plans. Generally, the tree data structure has a maximum depth equal to the threshold number of plan refinement iterations.

Figure 6:
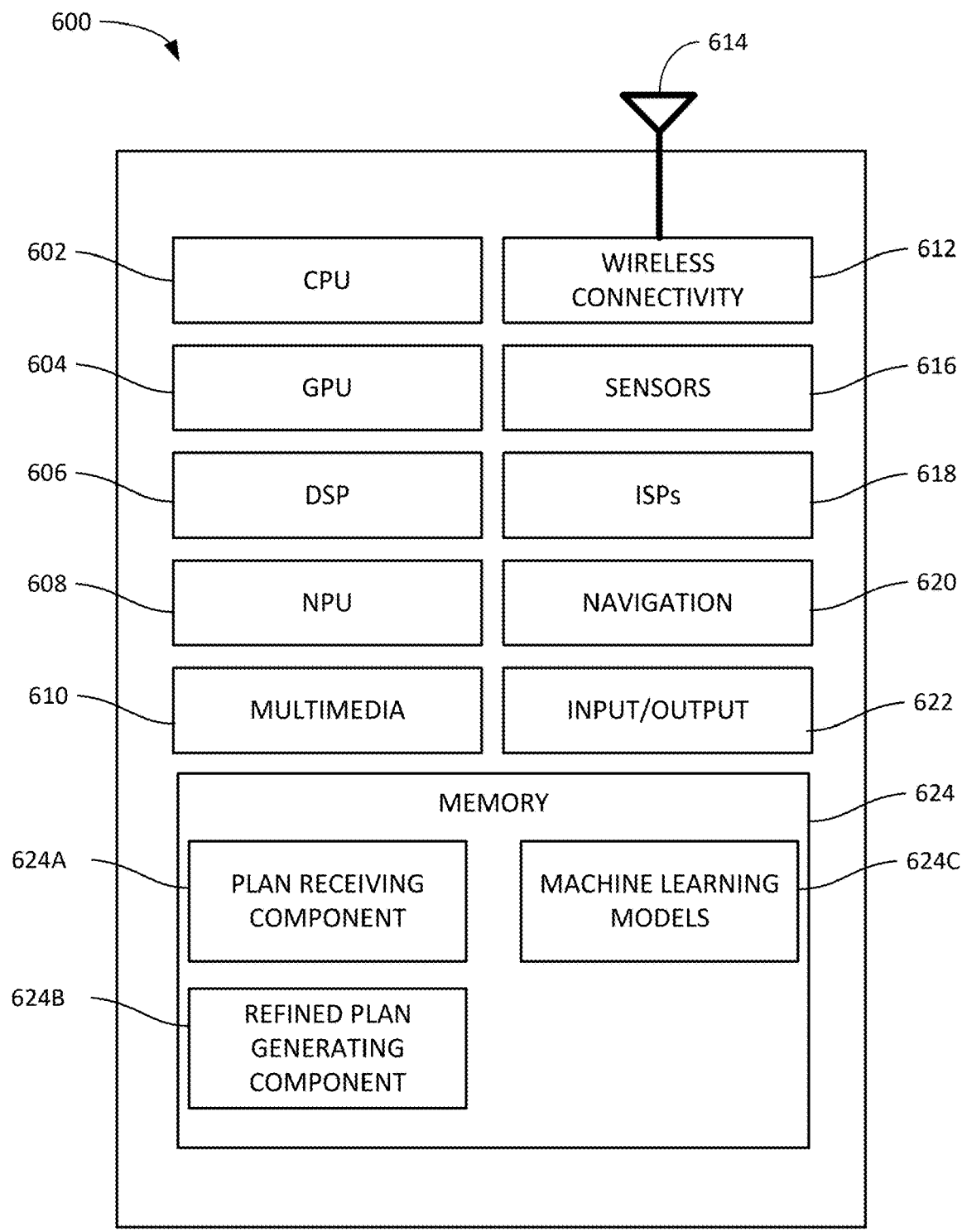
FIG. 6 depicts an example processing system configured to perform various aspects of the present disclosure.

Example Systems for Generating Execution Plans for Responding to Queries Using Artificial-Intelligence-Model-Based Assistants FIG. 6 depicts an example processing system 600 configured to perform various aspects of the present disclosure, including, for example, the techniques and methods described with respect to FIGS. 2-5. In some aspects, the processing system 600 may train, implement, or provide a machine learning model which uses quantized data to accelerate operations and perform machine learning model operations using less power than would be used if such operations were performed using non-quantized data. Although depicted as a single system for conceptual clarity, in at least some aspects, as discussed above, the operations described below with respect to the processing system 600 may be distributed across any number of devices.

The processing system 600 includes a central processing unit (CPU) 602, which in some examples may be a multi-core CPU. Instructions executed at the CPU 602 may be loaded, for example, from a program memory associated with the CPU 602 or may be loaded from a partition of memory 624.

The processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612.

An NPU, such as NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a system-on-a-chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this new data through an already trained model to generate a model output (e.g., an inference).

In some implementations, the NPU 608 is a part of one or more of the CPU 602, the GPU 604, and/or the DSP 606.

In some examples, the wireless connectivity component 612 may include subcomponents, for example, for third generation (3G) connectivity, fourth generation (4G) connectivity (e.g., 4G Long-Term Evolution (LTE)), fifth generation (5G) connectivity (e.g., New Radio (NR)), Wi-Fi connectivity, Bluetooth connectivity, and other wireless transmission standards. The wireless connectivity component 612 is further coupled to one or more antennas 614.

The processing system 600 may also include one or more sensor processing units 616 associated with any manner of sensor, one or more image signal processors (ISPs) 618 associated with any manner of image sensor, and/or a navigation component 620, which may include satellite-based positioning system components (e.g., GPS or GLONASS) as well as inertial positioning system components.

The processing system 600 may also include one or more input and/or output devices 622, such as screens, touch-sensitive surfaces (including touch-sensitive displays), physical buttons, speakers, microphones, and the like.

In some examples, one or more of the processors of the processing system 600 may be based on an ARM or RISC-V instruction set.

The processing system 600 also includes the memory 624, which is representative of one or more static and/or dynamic memories, such as a dynamic random access memory, a flash-based static memory, and the like. In this example, the memory 624 includes computer-executable components, which may be executed by one or more of the aforementioned processors of the processing system 600.

In particular, in this example, the memory 624 includes a plan receiving component 624A, a refined plan generating component 624B, and machine learning model 624C. Though depicted as discrete components for conceptual clarity in FIG. 6, the illustrated components (and others not depicted) may be collectively or individually implemented in various aspects.

Generally, the processing system 600 and/or components thereof may be configured to perform the methods described herein.

Notably, in other aspects, aspects of the processing system 600 may be omitted, such as where the processing system 600 is a server computer or the like. For example, the multimedia processing unit 610, the wireless connectivity component 612, the sensor processing units 616, the ISPs 618, and/or the navigation component 620 may be omitted in other aspects. Further, aspects of the processing system 600 may be distributed between multiple devices.

Example Clauses

Implementation details of various aspects of the present disclosure are described in the following numbered clauses:

Clause 1: A processor-implemented method for invoking functions in a computing system using machine learning models, comprising: receiving a plan to satisfy a request in the computing system and event log data associated with execution of the plan, the plan specifying a first plurality of actions to be performed by the computing system at a first level of granularity; and generating, using a plan refinement machine learning model, a refined plan when the event log data indicates that execution of the generated plan results in one or more execution errors and the one or more execution errors are solvable, the refined plan specifying a second plurality of actions to be performed by the computing system at a second level of granularity, the second level of granularity being finer than the first level of granularity.

Clause 2: The method of Clause 1, further comprising determining that the one or more execution errors are solvable, wherein the determining comprises determining, based on a generative artificial intelligence model and a set of prompt-engineered instructions, that a complexity associated with resolving the one or more execution errors is less than a threshold complexity level.

Clause 3: The method of Clause 1 or 2, wherein the plan refinement machine learning model comprises a generative model trained based on reinforcement learning with assistant feedback and wherein the assistant feedback comprises an indication of whether the refined plan generated by the plan refinement machine learning model is executable by an assistant configured to execute on another computing system.

Clause 4: The method of Clause 3, wherein the generative model is further trained to minimize a length of the refined plan.

Clause 5: The method of any of Clauses 1 through 4, wherein generating the refined plan comprises iteratively generating refined plans until one of the generated refined plans is accepted as an executable plan.

Clause 6: The method of any of Clauses 1 through 5, wherein generating the refined plan comprises iteratively generating refined plans until a threshold number of plan refinement iterations have been executed by the plan refinement model.

Clause 7: The method of Clause 1, wherein the plan refinement machine learning model comprises a tree model trained based on generating a tree data structure including a plurality of nodes, wherein each node in the tree data structure comprises one of a plan or one or more refined plans, and wherein the tree data structure has a maximum depth equal to a threshold number of plan refinement iterations.

Clause 8: A processing system comprising: at least one memory comprising computer-executable instructions; and one or more processors configured to execute the computer-executable instructions and cause the processing system to perform a method in accordance with any of Clauses 1 through 7.

Clause 9: A processing system comprising means for performing a method in accordance with any of Clauses 1 through 7.

Clause 10: A non-transitory computer-readable medium comprising computer-executable instructions that, when executed by one or more processors of a processing system, cause the processing system to perform a method in accordance with any of Clauses 1 through 7.

Clause 11: A computer program product embodied on a computer-readable storage medium comprising code for performing a method in accordance with any of Clauses 1 through 7.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system for invoking functions in a computing system using machine learning models, comprising:
    at least one memory having executable instructions stored thereon; and
    one or more processors configured to execute the executable instructions to cause the processing system to:
        receive a plan to satisfy a request in the computing system and event log data associated with execution of the plan, the plan specifying a first plurality of actions to be performed by the computing system at a first level of granularity;
        generate, using a plan refinement machine learning model, a refined plan when the event log data indicates that execution of the generated plan results in one or more execution errors and the one or more execution errors are solvable, the refined plan specifying a second plurality of actions to be performed by the computing system at a second level of granularity, the second level of granularity being finer than the first level of granularity; and
        determine that the one or more execution errors are solvable, wherein to determine that the one or more execution errors are solvable, the one or more processors are configured to cause the processing system to determine, based on a generative artificial intelligence model and a set of prompt-engineered instructions, that a complexity associated with resolving the one or more execution errors is less than a threshold complexity level.

2. The processing system of claim 1, wherein the plan refinement machine learning model comprises a generative model trained based on reinforcement learning with assistant feedback and wherein the assistant feedback comprises an indication of whether the refined plan generated by the plan refinement machine learning model is executable by an assistant configured to execute on another computing system.

3. The processing system of claim 2, wherein the generative model is further trained to minimize a length of the refined plan.

4. The processing system of claim 1, wherein to generate the refined plan, the one or more processors are configured to cause the processing system to iteratively generate refined plans until one of the generated refined plans is accepted as an executable plan.

5. The processing system of claim 1, wherein to generate the refined plan, the one or more processors are configured to cause the processing system to iteratively generate refined plans until a threshold number of plan refinement iterations have been executed by the plan refinement machine learning model.

6. The processing system of claim 1, wherein the plan refinement machine learning model comprises a tree model trained based on generating a tree data structure including a plurality of nodes, wherein each node in the tree data structure comprises one of a plan or one or more refined plans, and wherein the tree data structure has a maximum depth equal to a threshold number of plan refinement iterations.

7. A processor-implemented method for invoking functions in a computing system using machine learning models, comprising:
    receiving a plan to satisfy a request in the computing system and event log data associated with execution of the plan, the plan specifying a first plurality of actions to be performed by the computing system at a first level of granularity;
    generating, using a plan refinement machine learning model, a refined plan when the event log data indicates that execution of the generated plan results in one or more execution errors and the one or more execution errors are solvable, the refined plan specifying a second plurality of actions to be performed by the computing system at a second level of granularity, the second level of granularity being finer than the first level of granularity;
    determining that the one or more execution errors are solvable, wherein the determining comprises determining, based on a generative artificial intelligence model and a set of prompt-engineered instructions, that a complexity associated with resolving the one or more execution errors is less than a threshold complexity level.

8. The method of claim 7, wherein the plan refinement machine learning model comprises a generative model trained based on reinforcement learning with assistant feedback and wherein the assistant feedback comprises an indication of whether the refined plan generated by the plan refinement machine learning model is executable by an assistant configured to execute on another computing system.

9. The method of claim 8, wherein the generative model is further trained to minimize a length of the refined plan.

10. The method of claim 7, wherein generating the refined plan comprises iteratively generating refined plans until one of the generated refined plans is accepted as an executable plan.

11. The method of claim 7, wherein generating the refined plan comprises iteratively generating refined plans until a threshold number of plan refinement iterations have been executed by the plan refinement machine learning model.

12. The method of claim 7, wherein the plan refinement machine learning model comprises a tree model trained based on generating a tree data structure including a plurality of nodes, wherein each node in the tree data structure comprises one of a plan or one or more refined plans, and wherein the tree data structure has a maximum depth equal to a threshold number of plan refinement iterations.

13. A non-transitory computer-readable medium having executable instructions stored thereon which, when executed by one or more processors, performs an operation for invoking functions in a computing system using machine learning models, the operation comprising:
    receiving a plan to satisfy a request in the computing system and event log data associated with execution of the plan, the plan specifying a first plurality of actions to be performed by the computing system at a first level of granularity;
    generating, using a plan refinement machine learning model, a refined plan when the event log data indicates that execution of the generated plan results in one or more execution errors and the one or more execution errors are solvable, the refined plan specifying a second plurality of actions to be performed by the computing system at a second level of granularity, the second level of granularity being finer than the first level of granularity; and determining that the one or more execution errors are solvable, wherein the determining comprises determining, based on a generative artificial intelligence model and a set of prompt-engineered instructions, that a complexity associated with resolving the one or more execution errors is less than a threshold complexity level.

14. The computer-readable medium of claim 13, wherein the plan refinement machine learning model comprises a generative model trained based on reinforcement learning with assistant feedback and wherein the assistant feedback comprises an indication of whether the refined plan generated by the plan refinement machine learning model is executable by an assistant configured to execute on another computing system.

15. The computer-readable medium of claim 14, wherein the generative model is further trained to minimize a length of the refined plan.

16. The computer-readable medium of claim 13, wherein generating the refined plan comprises iteratively generating refined plans until one of the generated refined plans is accepted as an executable plan.

17. The computer-readable medium of claim 13, wherein generating the refined plan comprises iteratively generating refined plans until a threshold number of plan refinement iterations have been executed by the plan refinement machine learning model.

* * * * *